Figure 1:
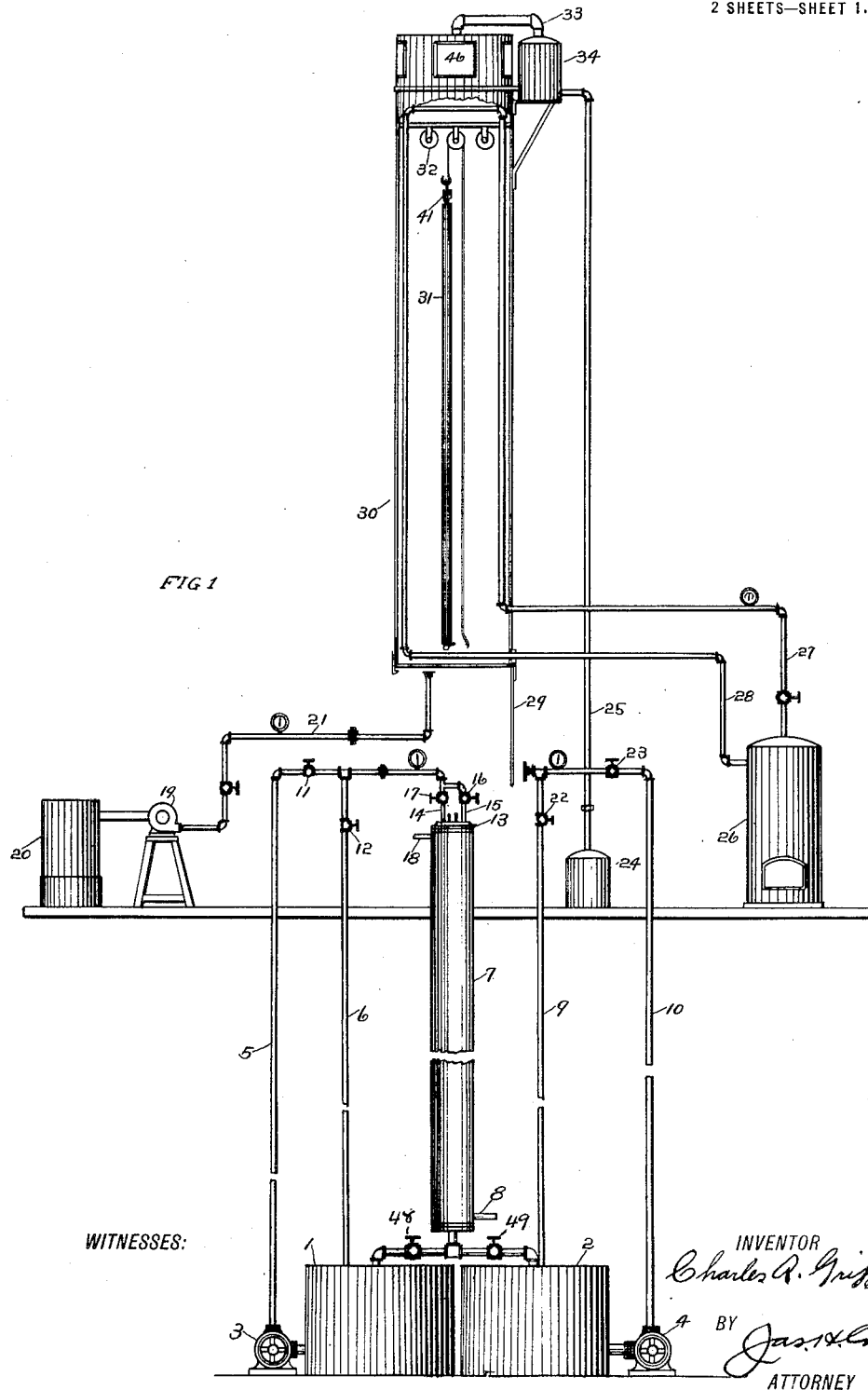

C. R. GRIFFITH.
PROCESS AND APPARATUS FOR MANUFACTURING HOSE.
APPLICATION FILED OCT. 23, 1916.

1,319,387.

Patented Oct. 21, 1919.
2 SHEETS—SHEET 1.

WITNESSES:

INVENTOR
Charles R. Griffith
BY
Jas. H. Curry
ATTORNEY

C. R. GRIFFITH.
PROCESS AND APPARATUS FOR MANUFACTURING HOSE.
APPLICATION FILED OCT. 23, 1916.
1,319,387.
Patented Oct. 21, 1919.
2 SHEETS—SHEET 2.
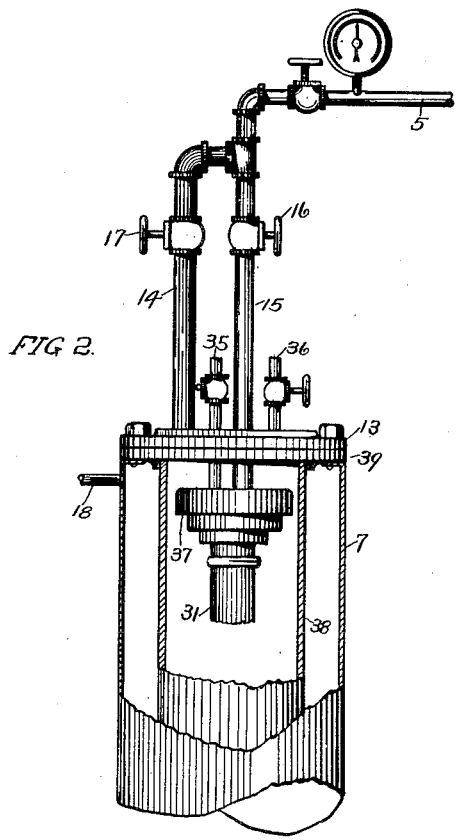
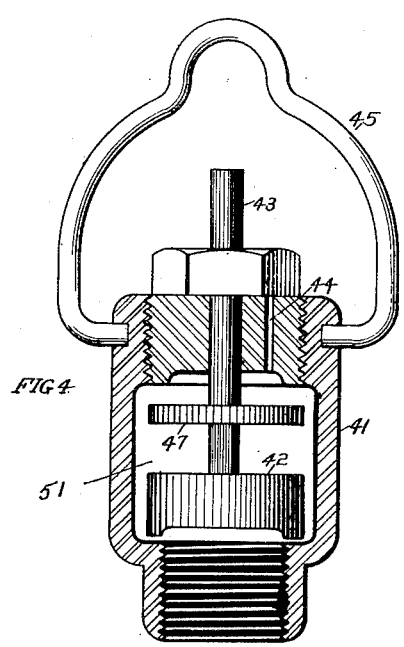
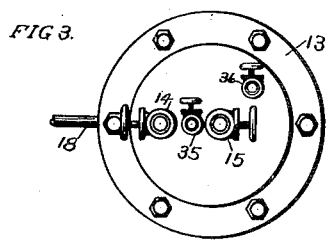
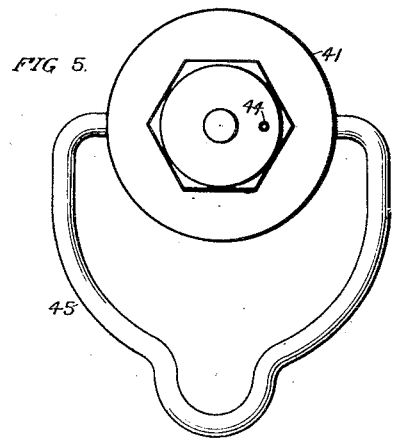
INVENTOR
Charles R. Griffith
BY
Jas. H. Cary
ATTORNEY

UNITED STATES PATENT OFFICE.

CHARLES R. GRIFFITH, OF PORTLAND, OREGON.

PROCESS AND APPARATUS FOR MANUFACTURING HOSE.

1,319,387.　　　　　Specification of Letters Patent.　　Patented Oct. 21, 1919.

Application filed October 23, 1916.　Serial No. 127,101.

*To all whom it may concern:*

Be it known that I, CHARLES R. GRIFFITH, a citizen of the United States, residing at Portland, in the county of Multnomah and State of Oregon, have invented new and useful Improvements in Processes and Apparatus for Manufacturing Hose, of which the following is a specification.

My invention relates to that class of hose which is made up of a fabric treated with a water-proofing composition and has especial reference to the treatment of fabrics for hose making purposes that are woven, knitted or braided in tubular form. The defects of a hose made up of layers or plies of canvas and rubber are well known; to get the necessary strength to withstand pressure the number of layers is multiplied and thus the hose becomes heavy and unwieldy; also rubber deteriorates quite rapidly after the vulcanization process used in hose manufacture and the life of such a hose is comparatively short, both because of this deterioration and because of the stiffness of the fabric after such treatment with the rubber composition, which does not allow the hose to bend readily and frequently without cracking. I have discovered that if the hose fabric is treated with a solution of balata in the manner I am about to describe, that such defects are entirely overcome and the object of my invention is to provide a light, durable hose that will withstand heavy pressures; that will not crack after persistent "kinking"; that will not deteriorate; that is oil and acid resisting and that can be handled much more easily than a rubber hose of equal capacity and pressure strength.

Referring to the drawings, Figure 1 is an elevation showing somewhat diagrammatically a form of apparatus used to carry out my process. Fig. 2 shows in detail the top part of the vertical section 7; Fig. 3 is a top view of the head 13, showing relation of the inlet pipes 14 and 15 and the air vents 35 and 36. Fig. 4 is a vertical section through float check valve 41, which is used when the hose is suspended in the drying tower 30. Fig. 5 is a top view of valve 41, showing air vent 44.

In Fig. 1, 7 is a vertical heated section with an inner impregnating chamber in which the hose fabric is treated with a solution of balata under pressure, the tank 1 holding the solution which is pumped through pipe 5 by pump 3. This section 7 is shown in a vertical position, which is preferable, but if space will not permit of such an arrangement, it can be placed horizontally. 30 is the drying chamber, which may be of any convenient size and shape, conveniently arranged so that the hose fabrics being treated may be raised and lowered as desired and moved laterally to allow the succeeding hose to be hoisted out of the impregnating chamber 38. 26 is a steam boiler, pipes 27 and 28 indicating a heating system for drying tower 30. 20 is a hot air heater and 19 the fan which blows it through pipe 21 into the inside of the hose suspended in 30 when connected for that purpose. 34 is a condenser to reclaim the fumes of the solvent as it comes from the drying tower, the liquid gathering in the tank 24. Tank 2 holds a solution of rubber compound which is pumped by 4 into the hose suspended in the drier 30 when desirable, as will presently be explained.

Following out the process in detail, the tank 1, Fig. 1, is filled with a solution of balata, the solvent being any of several well known solvents for this gum, such as carbon-bisulfid, benzin, benzole, gasolene; the solvent I have had the best success with is benzole. I generally use it in the proportions of three pounds of balata to one gallon of benzole. Suspended within the inner vertical impregnating chamber 38, Fig. 2, is a length of woven, knit or braided tubular fabric 31 about fifty feet long connected as shown to the head 13. The bushings 37 are to accommodate the various sizes of hose it is desired to treat. Steam, or some heating agent, is circulated in the chamber between the walls of 7 and 38, through connections 8 and 18, Fig. 1, as better results are obtained if the fabric is treated at a temperature between 130° to 140° Fahrenheit. The hose fabric is closed at its lower end, not shown. The bottom of chamber 38 is connected by a pipe to both tanks 1 and 2, the valves 48 and 49 being closed tightly except when it is desired to drain the surplus solution in 38 back into the tanks 1 or 2. A vent 35, Fig. 2, allows the escape of the air in hose 31 when the solution is being injected into it. The valves 12 and 17 are closed, the valves 11 and 16 opened. The pump 3 then causes the balata solution to flow through pipes 5 and 15 into the suspended tubular fabric 31 and as soon as the hose is full the air vent 35 is closed and the pumping is continued until the gage registers the desired pressure which varies, of course, with the nature of the fabric being treated and the use to which the hose is to be put. A closely woven linen fabric, for example, to be used with high pressure, would be run up to 400 or 500 pounds pressure, while a loosely woven cotton jacket for a garden hose would only sustain a light pressure. The time also of holding pressure varies from a few minutes with a loosely woven fabric to several minutes with a closely knit one. If it is desired that the solution should thoroughly impregnate the yarn from which the fabric is made, both from the inside of the hose and from without the valve 16, Fig. 2, is closed and valve 17 is opened. This holds the solution within the tube 31 and fills the chamber 38 with the balata solution surrounding the outside of the hose 31; the vent 36 allows free escape of the air from chamber 38 as it is being filled. When full, the vent is closed and the pump raises the pressure to the desired point. By these means it will be found that even the closest of knit fabrics may be thoroughly impregnated.

This completes the first step of the process and the pump is now stopped and by opening valves 36 and 48 the solution in chamber 38 drains back into tank 1. Head 13 is taken off, the hose 31 detached and the device shown in Fig. 4, which will be described hereafter, is screwed in place at the top of the hose and it is hoisted into the drying chamber 30. When the lower end of 31 reaches the top of 7, it is opened and the solution drains into the chamber 38 and thence back to tank 1. If the fabric has been treated on the outside, the door 29 at the bottom of the drying chamber is closed and the hose given a thorough drying, the temperature of the chamber 30 being raised to at least 100° Fahrenheit. In practice it is found to be too slow to dry the inside of the hose wholly by this method, so after the outside coat is dry, the door 29 is opened and pipe 21 is connected to the bottom of the suspended hose 31 and hot air is blown through, driving off the solvent and thoroughly drying the inside of the hose in a few minutes. The fumes of the solvent escape through pipe 33 into the condenser 34 and thus a percentage of the liquid solvent is reclaimed in tank 24.

The hose is now ready for the second treatment. So far the yarn or fiber composing the hose fabric has been impregnated with balata, but the inside of the hose is still rough, no satisfactory inner tube having been formed as yet. To effect this, the center pipe 15 of head 13, Fig. 2, is connected with the bottom of the hose 31, just as in the first treatment it was connected with the top of the hose. At this point it is necessary to explain the construction and operation of the float check valve 41, Fig. 4. This is attached, as before stated, to the top of the hose. The inner chamber 51 is made large enough to accommodate the disk 47 and the float 42, which is preferably made of cork. Also it should be large enough to admit of an air cushion being formed, after the seating of the disk 47, of sufficient density to prevent the solution from reaching the disk 47, which otherwise would gum up and stick. An air vent 44 allows the air in the hose to escape when the solution is being forced in; also it allows air to enter the hose when the solution is being drawn off. When the solution reaches the cork float 42, the disk 47 is raised and is pressed against its seat, closing the air vent 44. The air in chamber 51 is consequently compressed as the pressure of the solution increases and an air cushion is thus formed which prevents the solution from reaching the disk 47. When the solution is drawn off, the float 42 drops down, the disk 47 is lowered, opening air vent 44 and the air passes into chamber 51, past the float 42,—which is cored underneath,—into the hose 31, allowing the solution to be drawn off readily and without collapsing the hose which would otherwise happen if a vacuum should form. The proper connections having been made, pump 3 forces the balata solution into the hose 31 in the drying chamber until the gage registers the proper pressure, a light pressure of 25 pounds being all that is necessary. The pump is then stopped, the valve 12 opened and the solution drains back to tank 1. Pipe 21 is then connected and the last coat dried by blowing hot air through the hose. 15 is again connected and a solution of balata once more forced into the hose under light pressure. This coat is then dried as before and these operations repeated until an inner tube of the desired thickness is formed. To insure a smooth coating free from air bubbles it is desirable to pull a wiper or drag through the hose with each successive treatment. This is especially necessary if only one coating is to be given with a heavy solution. With a thin solution, with a succession of deposits in building up the inner tube, I have found that a piece of felt attached to a weighted float that will just support itself in the solution will act satisfactorily. As the solution is injected into the hose this float rises and when the solution is drawn off the weight is sufficient to drag the felt downward through the hose, wiping off any surplusage of balata and preventing the formation of any air bubbles.

Unless for some special purpose, I find that it is not necessary to give the outside of the hose fabric a coating of balata, the treatment under pressure from the inside thoroughly impregnating the fabric and the building up of the inner tube giving such additional strength that a single jacket linen knit hose so treated will withstand very high pressures, 700# to 800#, without rupture. However, if the hose is to be used where the temperature may be high, instead of an inner lining of balata I build up an inner tube of rubber, for the balata tube might become tacky and cause the walls of the hose to stick together. The method of doing this is just the same as with balata. Tank 2, Fig. 1, contains a solution of rubber compound, which pump 4, through pipe 10, injects into the hose suspended in 30, using the head 13 as before. The rubber solution is then drained back into tank 2, hot air is blown through the hose and the operation repeated until the proper thickness of rubber has been deposited. This rubber coating is then "cured" by mixing the proper amount of sulfur with the rubber compound and injecting steam into the hose or it may be vulcanized by a cold cure method. This leaves the balata in the fabric uncured, which is very desirable, as in its pure and unaltered state balata does not deteriorate. The balata inner tube may also be vulcanized by either the hot or cold process, after which it could be used with comparatively high temperatures and the walls of the hose would not stick together. If a heavy yarn is used in making up the hose fabric for large capacities and hard service, impregnate the yarn before weaving or knitting by saturating in a balata solution under pressure or running between pressure rolls. Then treat as usual, forcing a solution of balata into the tubular jacket under pressure.

Hoses for various purposes can be readily made by my process with very marked advantages over the usual type of rubber hose for the same use.

Throughout the description and claims I have used the word "tubular" to express the usual form of hose, but I do not limit myself to this hollow, cylindrical and pipe like form, for the hose and tubing may be of any shape and my process will work equally well.

I claim:

1. The process of making hose which consists of completely filling a tubular fabric with a solution of balata and then draining off the unabsorbed solution.

2. The process of making hose which consists of filling a tubular fabric with a solution of balata under pressure and then draining off the unabsorbed solution.

3. The process of making hose which consists of impregnating a tubular hose fabric from within by completely filling with a solution of balata under heat and pressure.

4. The process of making hose which consists of completely filling a tubular fabric with a solution of waterproofing composition and then draining off the unabsorbed solution.

5. The process of making hose which consists of filling a tubular fabric with a solution of waterproofing composition under pressure and then draining off the unabsorbed solution.

6. The process of making hose which consists of impregnating a tubular fabric from within with a solution of a waterproofing composition under heat and pressure and from without with a solution of a waterproofing composition under heat and pressure.

7. The process of making hose which consists of impregnating a tubular fabric from within with a solution of balata under hydrostatic pressure and from without with a solution of balata under hydrostatic pressure.

8. The process of making hose which consists of impregnating a tubular fabric from within with a solution of waterproofing composition under hydrostatic pressure and from without with a solution of waterproofing composition under hydrostatic pressure.

9. The process of making hose which consists of impregnating a tubular fabric from within by completely filling with a solution of a waterproofing composition under heat and pressure.

10. The process of making hose which consists of impregnating a tubular fabric with a solution of balata under pressure, then drying the hose and then building up an inner tube therein by successively treating the inside of the hose with a solution of balata and then drying same, until the desired thickness of balata has been deposited in a homogeneous coating.

11. The process of making hose which consists of impregnating a tubular fabric with a solution of balata under pressure, then drying the hose and then building up an inner tube therein by successively treating the inside of the hose with a solution of balata and then drying same, until the desired thickness of balata has been deposited in a homogeneous coating and then vulcanizing this balata inner tube.

12. The process of making hose which consists of impregnating a tubular hose fabric with a solution of balata under pressure, then drying the hose and then building up an inner tube therein by successively treating the inside of the hose with a solution of balata and then drying same until the desired thickness of balata has been deposited in a homogeneous coating and then depositing a rubber coating thereon and vulcanizing same.

13. In an apparatus for making hose, an inner impregnating chamber in which the tubular fabric to be treated is placed, an outer heating chamber surrounding this inner chamber, a container to hold a solution of water-proofing composition, means for forcing the solution into the tubular fabric under pressure from within, and means for drying the impregnated tubular fabric.

14. In an apparatus for making hose, an inner impregnating chamber in which the tubular fabric is suspended, an outer heating chamber, a container to hold a solution of waterproofing composition and means for forcing the solution into the fabric under pressure from within.

15. In an apparatus for making hose, an inner impregnating chamber in which the tubular fabric is suspended, an outer heating chamber, a container to hold a solution of waterproofing composition, means for forcing the solution into the fabric under pressure from within, and means for impregnating the fabric from without with a solution of waterproofing composition under pressure.

16. In an apparatus for making hose, an inner impregnating chamber in which the tubular fabric is suspended, an outer heating chamber, a container to hold a solution of waterproofing composition, means for forcing the solution into the fabric under pressure from within, means for impregnating the fabric from without with a solution of waterproofing composition under pressure from within, and means for drying the hose.

17. In an apparatus for making hose, an impregnating chamber in which the hose is suspended, a hollow head within said chamber adapted to receive one end of the hose, a supply pipe leading to said head, and an air vent from the head.

18. In an apparatus for making hose, an impregnating chamber in which the tubular hose fabric is suspended, a hollow head within said chamber adapted to receive one end of the hose, a supply pipe leading to said head, an air vent from the head, a supply pipe to the impregnating chamber and an air vent from said chamber.

19. In an apparatus for making hose, an outer heating chamber, an inner impregnating chamber in which the tubular hose fabric is suspended, a hollow head within said chamber adapted to receive one end of the hose, a supply pipe leading to said head and an air vent from the head.

20. In an apparatus for making hose, an outer heating chamber, an inner impregnating chamber in which the tubular hose fabric is suspended, a hollow head within said chamber adapted to receive one end of the hose, a supply pipe leading to said head, an air vent from the head, a supply pipe to the impregnating chamber and an air vent from said chamber.

21. In an apparatus for making hose, a check valve consisting of a valve body, an inner chambered section therein, an air vent from said chamber, a valve stem with a lower disk thereon made of buoyant material and an upper disk on the valve stem adapted to close the air vent when the lower disk raises.

CHARLES R. GRIFFITH.